United States Patent [19]
Ismael et al.

[11] Patent Number: 6,061,721
[45] Date of Patent: *May 9, 2000

[54] BEAN-BASED MANAGEMENT SYSTEM

[75] Inventors: Osman Abdoul Ismael, Grenoble; Serge Andre Rigori, Proveyzieux, both of France

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/944,174

[22] Filed: Oct. 6, 1997

[51] Int. Cl.[7] ........................................ G06F 15/16
[52] U.S. Cl. ........................ 709/223; 709/224; 709/228; 709/218
[58] Field of Search ................ 395/200.33, 200.53, 395/200.58, 200.54, 200.48, 183.09; 707/103; 709/203, 218, 223, 224, 228; 714/33

[56] References Cited

U.S. PATENT DOCUMENTS

| | | | |
|---|---|---|---|
| 5,063,523 | 11/1991 | Vrenjak | 395/200.54 |
| 5,315,703 | 5/1994 | Matheny et al. | 395/164 |
| 5,367,633 | 11/1994 | Matheny et al. | 395/164 |
| 5,414,812 | 5/1995 | Filip et al. | 395/200.58 |
| 5,768,510 | 6/1998 | Gish | 395/200.33 |
| 5,809,235 | 9/1998 | Sharma et al. | 395/200.54 |
| 5,848,236 | 12/1998 | Dearth et al. | 395/500 |
| 5,848,246 | 12/1998 | Gish | 395/200.58 |

*Primary Examiner*—Zarni Maung
*Assistant Examiner*—Philip B. Tran
*Attorney, Agent, or Firm*—Conley, Rose & Tayon, PC; B. Noel Kivlin

[57] ABSTRACT

A network management system is generated by composing a network management model using a bean-based environment and then compiling the model to implement the computer network management system in the bean-based environment. Beans provide a set of properties, a set of methods for performing actions, and support for events and for introspection. The beans are directly able to model the characteristics of components of a system to be modelled. The beans can also be compiled directly to provide the implementation of the model. As a result, the need for a separate environment for modelling a management system from that used to implement that management system can be avoided.

18 Claims, 12 Drawing Sheets

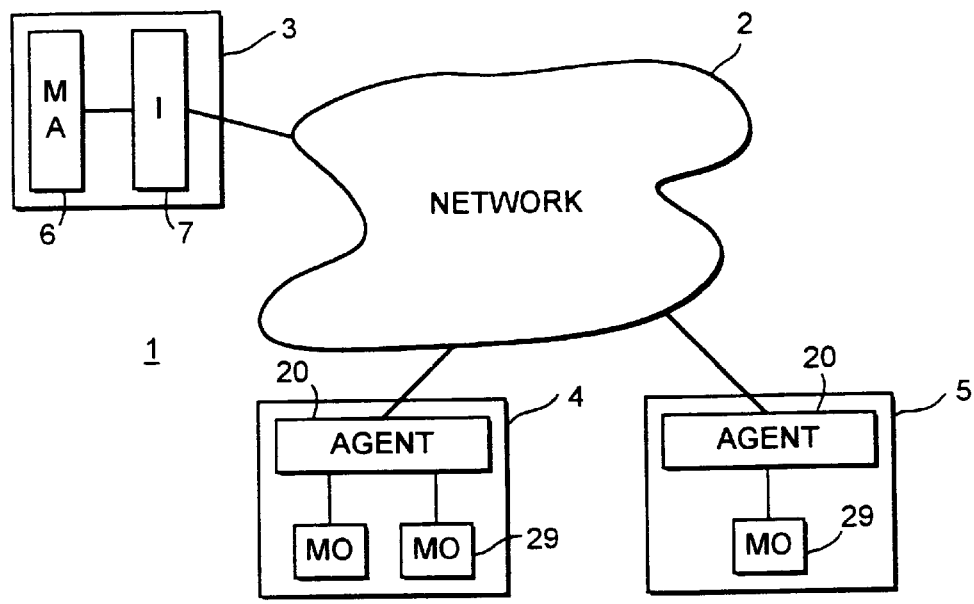
FIG. 1
FIG. 2A
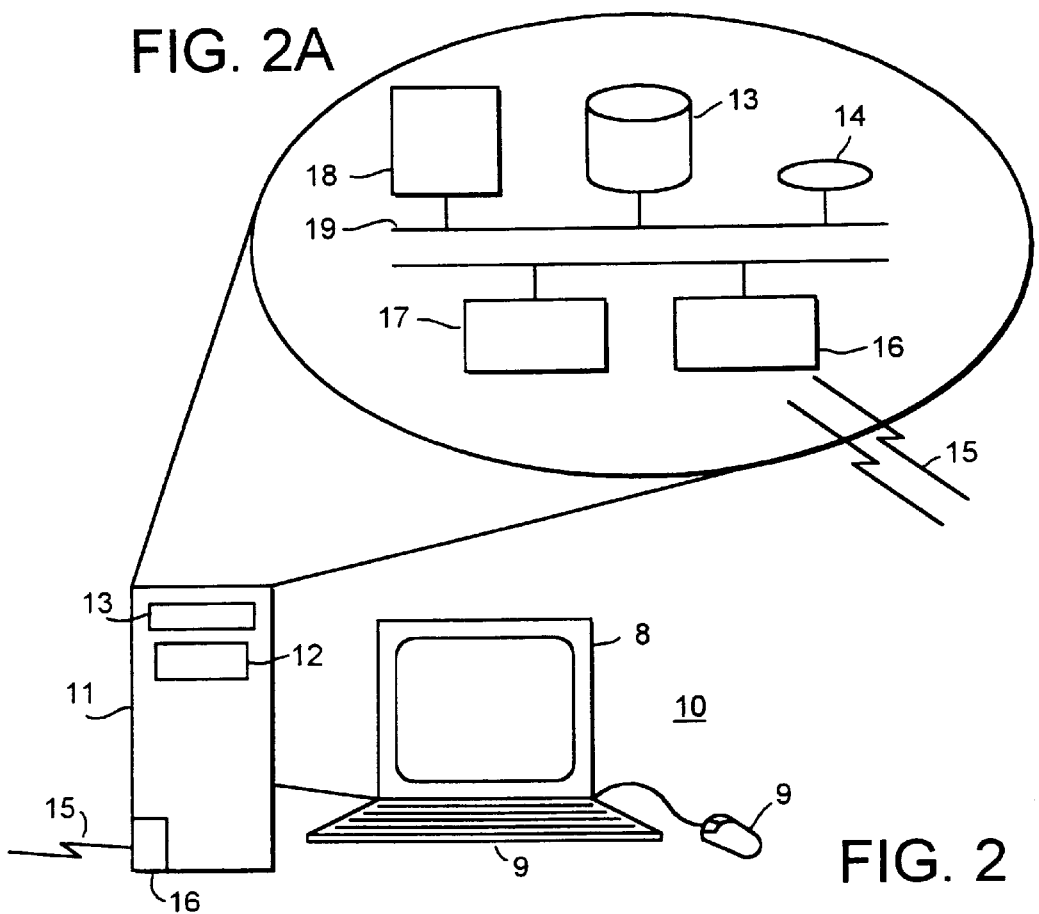
FIG. 2

```
package sunw.jaw.example.mo.Simple;
/**
 * Generated by mogen Compiler version;
 *       @ (#) Main.java 1.11 97/05/16 SMI
 */
import java.jaw.common.*;
import java.jaw.client.mo.*;

public interface SimpleMO extends ManagedObject {
  public String getState()
      throws InstanceNotFoundException, CommunicationException,
      IllegalAccessException, ServiveNotFoundException,
      PropertyNotFoundException;

public Integer getNbChanges ()
      throws InstanceNotFoundException, CommunicationException,
      IllegalAccessException, ServiceNotFoundException,
      PropertyNotFoundException;

public void setState (String value)
      throws InstanceNotFoundException, CommunicationException,
      IllegalAccessException, ServiceNotFoundException,
      PropertyNotFoundException, InvalidPropertyValueException,
      InstantiationException, ClassNotFoundException;

```
package sunw.jaw.example.mo.Simple;

/**
 * Very simple of definition of a Beans MO
 * No special import required.
 */ public class Simple implements java.io.Serializable {
        private String state;
        private Integer nbChanges;

public Simple () {
                state    = "construct";
                nbChanges = new Integer (0);
        } public String getState () {
                return (state);
        } public void setState (String s) {
                state = s;
                nbChanges = new Integer (nbChanges.intValue () + 1);
        } public Integer getNbChanges () {
                return (nbChanges) ;
        }
}
```

FIG. 15B

```
....
public interface simpleMBeanMO extends ManagedObject {
....
public Boolean performReverse (integer p0)
     throws InstanceNotFoundException, CommunicationException,
     IllegalaccessException, ServiceNotFoundException,
     NoSuchMethodException;

public void performReverse
   throws InstanceNotFoundException, CommunicationException,
     IllegalAccessException, ServiceNotFoundException,
     NoSuchMethodexception;

```
....
public class simpleMBean implements java.io.Serializable {
...
public void performReverse () {
       StringBuffer buf = new StringBuffer (name);

name = buf.reverse ().toString ();
   } public Boolean performReverse (Integer nFirst) {
       StringBuffer buf  = new StringBuffer ();
       int        n    = nFirst.intValue ();

if (name.length () < n + 1) {
         return (new Boolean (false));
       } buf.append (name.substring (0, n));

name = new String (buf.reverse ().toString () +
name.substring (n));
       return (new Boolean (true));
     }
  ...
  }
```

FIG. 16B

BEAN-BASED MANAGEMENT SYSTEM

BACKGROUND OF THE INVENTION

The invention relates to network management systems and in particular to the generation of a network model for such a system.

Network management systems find application to the management of systems remotely via a telecommunications system. Network management systems are known which permit the manipulation and control of a large number and variety of objects over a network in accordance with a relatively limited set of commands, including operations such as GET, SET, ACTION, CREATE and DELETE. An example of such a network management system is the so-called Telecommunications Management Network (TMN) environment.

The TMN environment provides an industry standard Common Management Information Protocol (CMIP) and supports X710/ISO 9595 Common Management Information Services (CMIS) under that protocol. These services allow manipulation of a large number and variety of objects over a network in accordance with a relatively limited set of commands, including operations such as GET, SET, ACTION, CREATE and DELETE.

The physical configuration of the network on which the network management system is configured can take many different forms, including, by way of example, a public switched telephone network and/or a local area network and/or a dedicated network connecting computer and other equipment within a local area and/or over a wider area, or an open network such as the Internet or an intranet. The objects typically comprise parameters and methods used to model a piece of equipment, a component of that equipment, an operation of the equipment or a component thereof, and so on.

One difficulty with existing network management systems relates to the generation of the network model. For example, in the TMN environment, objects are defined in accordance with the industry standard X722/ISO-10165-4 Guidelines for Definition of Managed Objects (GDMO). The GDMO defines data, or parameter, types in accordance with the X208/ISO-8824 Abstract Syntax Notation One (ASN.1) and the X209/ISO-8825 Specification of Basic Encoding Rules for Abstract Notation One (BER) for data notation. These various industry standards are defined by the International Standards Organisation (ISO).

GDMO is a formal descriptive language which is not directly understood by a computer. It is therefore necessary to convert GDMO into a computer-understandable format. As there is no standard for such a process, this often leads to multiple interpretations, which in turn leads to interoperability problems.

In order to invoke the CMIS, it is necessary to generate the implementation Application Programming Interface (API). Typically, APIs have been created using programming languages such as C or C++. Although the various standard do exist, this stage is very expensive and potentially dangerous. Very significant programmer involvement is required to create the API's. Apart from the expense, there is also the problem of reliability and verification of the resulting API. A further problem, resulting from the mix of a program-based API for the ASN.1 and GDMO standards is the difficulties encountered when there is a need to expand the network services, for example by defining new types and instances of objects (e.g., a new type of workstation for a network manager). In other words, the conventional approach to providing an API is problematic in a dynamic network management environment.

A general aim of the invention is to provide an improved approach to the development of a more flexible network management environment.

SUMMARY OF THE INVENTION

In accordance with a first aspect of the invention, there is provided a computer-implemented method of generating a computer network management system comprising steps of:

a) defining a network management model including at least one management bean using a bean-based environment; and b) compiling the model to implement the computer network management system in the bean-based environment.

By defining a model in a bean-based environment, it is possible directly to compile the bean-based model to form a bean-based implementation using a standard compiler for the bean-based environment.

In a preferred embodiment of the invention, the management beans are JavaBeans components (JavaBeans is a trademark of Sun Microsystems, Inc.). Beans are reusable software components which can be manipulated visually in a builder tool (e.g. an editor or graphical user interface builder (GUI builder)). An example of a builder tool is the JavaBeans Development Kit. Further details about beans can be found in many different works, for example in a book entitled Mastering JavaBeans by Lawrence Vanhelsuwé published by Sybex (ISBN 0-7821-2097-0). This is just one example of many broadly equivalent books on the market having "JavaBeans" in the title and describing the JavaBeans. Many of these works, including the book Mastering JavaBeans, supply the Bean Development Kit mentioned above.

Beans vary in functionality, but they typically share certain common defining features providing a set of properties, a set of methods for performing actions, and support for events and for introspection, also known as reflection. The properties allow beans to be manipulated programmatically and support customization of the bean. The methods implement the properties. The support for events enables beans to fire events and define the events which can be fired. The support for introspection enables the properties, events and methods of the bean to be inspected from externally.

The present invention recognises for the first time that beans provide a vehicle for modelling resources to be managed.

For example, step (a) can comprise defining at least one property in a management bean for modelling a property (e.g. a resource attribute such as the size of a memory, the number of messages received in a buffer, etc) of a managed resource. It can also comprise defining at least one method for a management bean for modelling an action (e.g. a system reset) of a managed resource. It can also include defining support for at least one event (for example a disk full event) for a managed resource. To this end, the management beans can provide support for a listener event, whereby one management bean can be responsive to an event on another management bean.

A management bean provides support for introspection which permits external analysis of the composition of the bean and the exchange of information between beans.

Thus, the management beans can include definitions of relationships and interactions between management beans as representative of the relationships and interaction between the managed resources.

In a preferred embodiment of the invention, step (b) comprises:

i) registering at least one management bean with an extensible agent framework;

ii) registering at least one network adaptor for a network communications protocol with the extensible agent framework; and ii) enabling external access via the network to at least one management bean via at least one network adaptor.

U.S. Pat. No. 5,315,703 and U.S. Pat. No. 5,367,633 describe object-based systems which include a framework for permitting change notification functions. However, these patents describe stand-alone systems.

Preferably, extensible agent framework comprises an associated repository bean and step (b)(ii) comprises registering at least one management bean and/or at least one network adaptor with the repository bean.

The network adaptor can be formed by a network adaptor bean.

In accordance with another aspect of the invention, there is provided a computer network management system comprising:

an object-based network management modelling environment; and a compiler for the object-based environment for generating the computer network management system implementation in the object-based environment.

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 1 is a schematic representation of three stations connected via a telecommunications network;

FIGS. 2 and 2A form a schematic representation of a computer server for a station of FIG. 1;

FIGS. 15A and 15B are used to illustrate the effect of compiling a management bean;

FIGS. 16A and 16B are also used to illustrate the effect of compiling a management bean.

DESCRIPTION OF THE PREFERRED EMBODIMENTS

Figure 3:
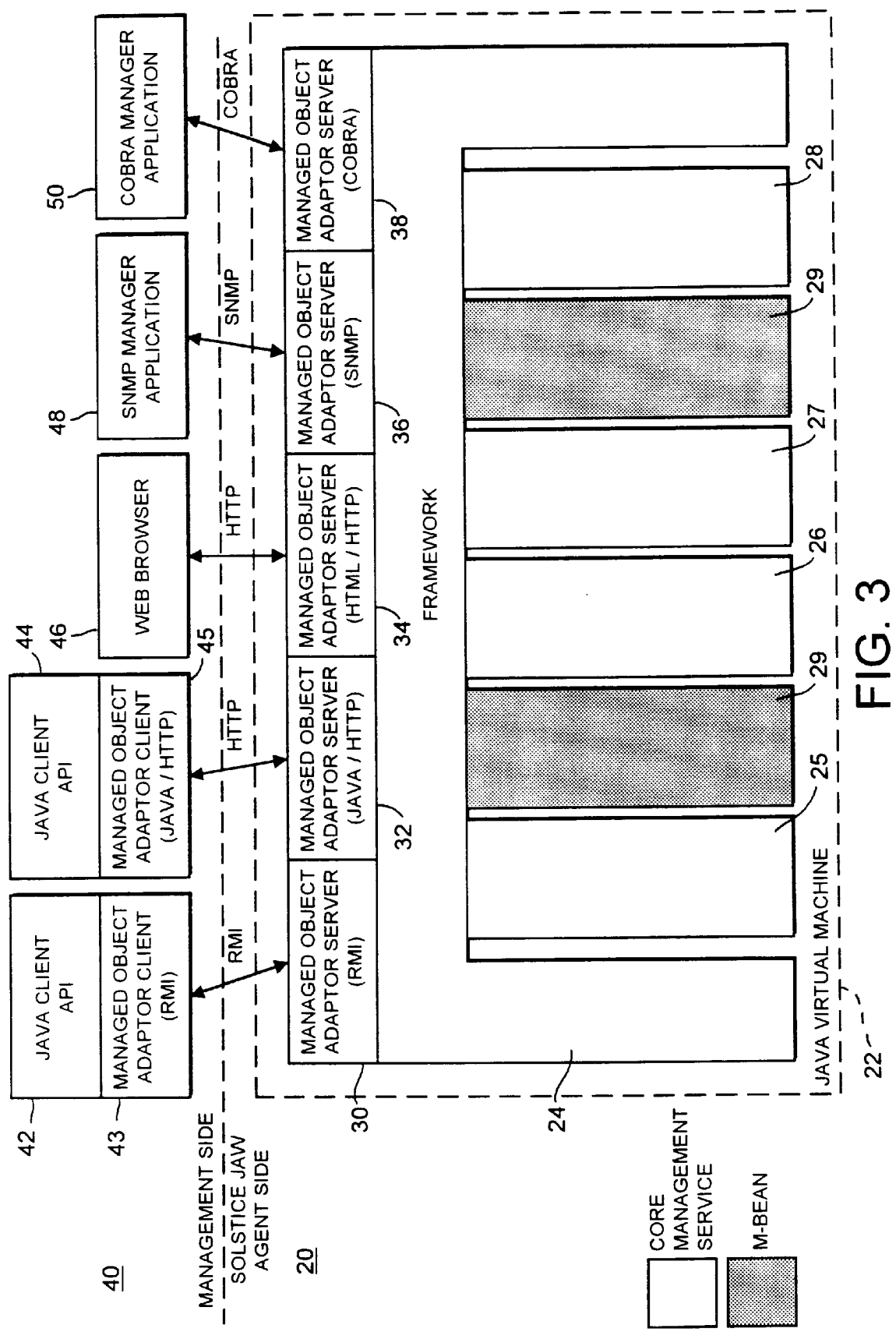
FIG. 3 is a schematic representation of an agent for a managed station.

FIG. 1 is a schematic representation of a multi-station network based system 1 with three stations, or nodes, or machines 3, 4 and 5 connected via a network 2. The network 2 can be based on a public switched telephone network and/or a local area network and/or a dedicated network connecting computer and other equipment within a local area and/or over a wider area and/or an open network such as the Internet or an intranet, or combination thereof or indeed any other type of telecommunications network which can support the exchange of telecommunications management information. The network can have any desired structure, such as a level structure, a pyramidal hierarchy, etc.

Any one or more of the stations 3, 4 or 5 can be configured as a network management station. In the example shown in FIG. 1, it is assumed that station 3 is a management station and stations 4 and 5 are managed stations. It will be appreciated that any number of management stations and managed stations may be provided and that the three stations of FIG. 1 are for illustrative purposes only. Also, the managing and managed functions could be interchanged or indeed both managing and managed functions could be supported at one and the same station.

The stations can take on many forms. For the purposes of illustration it is assumed that both comprise computer workstations. FIG. 2 is a schematic representation of the configuration of a computer workstation. As illustrated in FIG. 2, this is implemented by a server computer 10 comprising a system unit 11 with a display 8, keyboard and other input devices 9. FIG. 2A is a schematic block representation of aspects of the contents of the system unit 11. As illustrated in FIG. 2A, the system unit includes a processor 17, memory 18, magnetic and/or optical disk drives 13 and 14, and a communications adaptor 16 for connection to one or more telecommunication lines 15 for connection to the telecommunications network 2. As illustrated in FIG. 2A, the components of the system unit are connected via a bus arrangement 19. It will be appreciated that FIGS. 2/2A are a general schematic representation of one possible configuration for a server computer for forming a router. It will be appreciated that many alternative configurations could be provided.

Where the workstation implements a management station, management application or applications and interface structures are typically provided by software which is stored in the memory of the workstation and executed by the processor of the workstation.

Where the workstation implements a managed station, an agent is responsive to remote management requests via the network from the management applications to provide an interface to managed objects at the managed stations. The agent and managed object structures are typically provided by software which is stored in the memory of the workstation and executed by the processor of the workstation.

The objects typically comprise parameters and methods used to model a piece of equipment, a component of that equipment, an operation of the equipment or a component or resource thereof, and so on.

The management of a telecommunications network requires applications of various sizes and complexities. Heavy managers, middle managers, extensible agents, smart agents and appliances all have a role in the management of a telecommunications network. A network management system incorporating the present invention provides an extensible agent framework allowing all of these different application types to be built on the same architecture. This extensible agent framework is provided by a component of the network management system. Alternative terms for the extensible agent framework in this context could be a "dynamic framework" or "open framework" or "runtime component", although the terms "framework" or "extensible agent framework" will be used herein.

The network management system is supplied with a set of core management services. A choice can be made from this set of services, and it can be extended to develop specific applications. Different services are loaded statically or dynamically into the framework to meet the requirements of a particular application.

A managed object in an example of a network agent incorporating the present invention is preferably implemented as a bean, more preferably a JavaBeans component. A bean (and a JavaBeans component) is a reusable software component which can be manipulated visually in a builder tool (e.g. an editor or graphical user interface builder (GUI builder). An example of a builder tool is the JavaBeans Development Kit. Beans vary in functionality, but they typically share certain common defining features providing a set of properties, a set of methods for performing actions, and support for events and for introspection. The properties allow beans to be manipulated programmatically and support customization of the bean. The methods implement the properties. The support for events enables beans to fire events and define the events which can be fired. The support for introspection enables the properties, events and methods of the bean to be inspected from externally. Operations such as GET, SET, ACTION, CREATE and DELETE can be supported.

A managed object in the agent is manageable as soon as it is registered with the framework. This arrangement enables an agent developed in accordance with this network management system to be manageable with minimal impact on the design of the agent.

As indicated above, an example of the network management system uses the JavaBeans component model, thereby easing the development of applications. In this example, all of the core management services are provided as JavaBeans components. Thus access can be had to them using a Java application builder, such as the well known JavaBeans Development Kit. Managed objects are developed as JavaBeans components. A JavaBeans component in the network management system agent can be accessed locally or remotely. This means that when developing managed objects with the network management system, it is not necessary to know to which communications protocol the managed object will be accessed.

The network management system simplifies the development of extensible agents. A set of core management services that the network management system provides can be extended and loaded into an agent while it is running. Most of the core management services are optional. This means that an agent developed using the network management system need only implement the service it uses. This feature enables the development of agents of differing sizes and complexities.

Agents developed using the network management system are also smart agents. A smart agent provides the services needed to process management requests. In a smart agent, much of the processing can be done locally in the agent itself, reducing the load on the network connection between the agent and managing system.

FIG. 3 illustrates an aspect of the architecture of a network management system agent, including the relationships between the components of the network management system. FIG. 3 also shows the relationship between the network management system agent and management applications.

As shown in FIG. 3, the network management system agent consists of a number of components inside a Java virtual machine (VM). These include:
 m-beans 29;
 the framework 24;
 core management services 25, 26, 27, 28;
 managed objects adaptor servers 30, 32, 34, 36 and 38.
These components will be described in more detail below.

A managed object is a software abstraction of a resource that is controlled and monitored by an agent. A managed object (eg. 28) is referred to as a management bean or m-bean. In an example of the network management system, all m-beans are implemented as JavaBeans components. Therefore, these can be accessed using a conventional Java application builder, such as the JavaBeans Development Kit mentioned earlier.

As for any other managed object, an m-bean has a set of properties, can perform a set of actions, and can emit a set of notifications or events. The network management system enables a distinction to be made between a read-only and a read-write property in an m-bean.

An m-bean is manageable as soon as it is registered with the framework 24. When an m-bean is registered, an object name is associated with it. The object name uniquely identifies the m-bean within the m-bean repository (see below). It enables a management application to identify the m-bean on which it is to perform a management operation. The object name of an m-bean is an arbitrary name that does not depend in any way on how the m-bean is implemented.

The framework 24 controls the management services and m-beans of an agent 20 are loaded into the framework 24. The framework, or runtime component, 24 is a JavaBeans component which comprises a set of properties, a set of methods for performing actions, and support for events and for introspection. The properties include getter and setter properties. The methods include methods to implement the getter and setter properties. The framework is also able to effect add object and remove object functions.

Whenever an agent 20 is requested to perform a management operation received through a network adaptor, the framework 24 calls the appropriate service to perform the requested operation. The framework 24 also handles communications between m-beans 28 and the managed object adaptor servers 30–38. An m-bean can query the framework 24 to obtain information on other m-beans 28 loaded into the same instance of the framework 24. Only one instance of the framework 24 is permitted within a virtual machine 22.

The network management system provides a number of core management services. In an example of the system, the core management services are defined as Java interfaces. The core management services are optional. This means that an agent developed using the network management system need only implement the services it uses. The core management services can be registered as m-beans, which allows some management operations to be formed on them for tuning their behaviour.

In the preferred example of the system, the core management services are provided as JavaBeans components. It is therefore possible to access them using a conventional Java application builder, such as the JavaBeans Development Kit mentioned earlier.

A number of the core management services are now to be described.

The m-bean repository service 27 obtains pointers to m-beans. Each time an m-bean is registered with the framework 24, the framework 24 calls the m-bean repository service 27 to store the identity of the m-bean. A name is associated with an m-bean. When querying the m-bean repository 27, agent and manager applications can identify an m-bean by its name. Different implementations of the m-bean repository service 27 are possible. One implementation uses a relational database for storing persistent m-beans, whereas another implementation employs simple memory for storing non-persistent m-beans.

Figure 4:
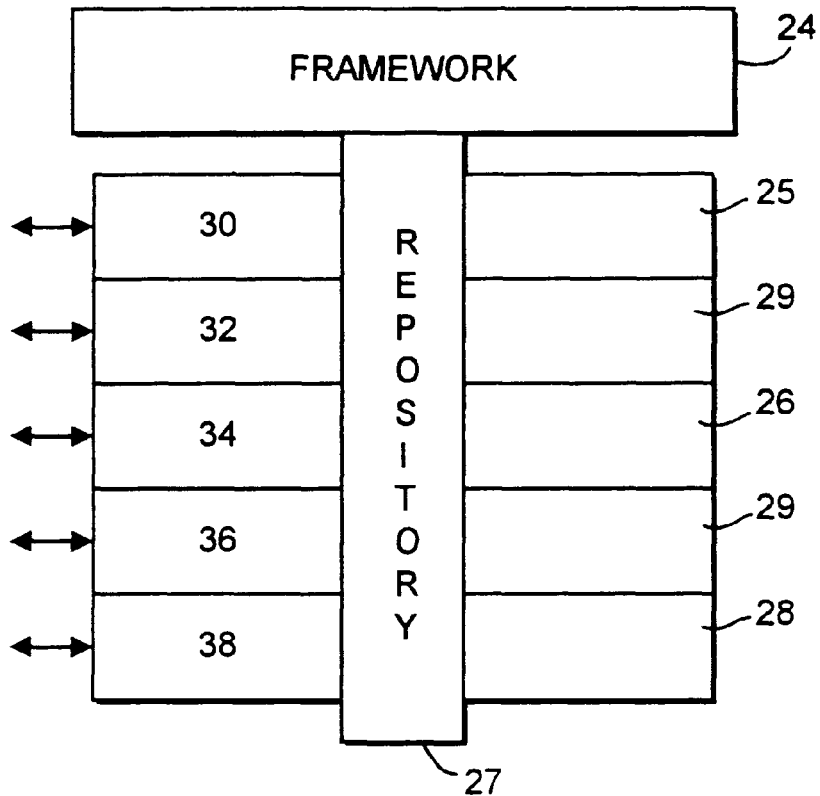
FIG. 4 is an alternative representation of the agent of FIG. 3.

Bearing in mind the structure provided by the repository unit, an alternative representation of the relationship between components of the agent is illustrated in FIG. 4. This takes account of the registration of the beans for the managed object adaptor servers, the management services and the managed objects with the m-bean repository service bean.

A filtering service 29 selects m-beans to be the subject of a management operation. Selection is based on the presence and values of specific attributes. For example, a filter could select all the m-beans for which the attribute color is set to red.

A metadata service 25 provides information on the structure of an m-bean. For example, the framework 24 queries the metadata service 25 to access methods for getting and setting up a property within an m-bean. The metadata service 25 is based on the Reflection API provided by the JavaBeans Development Kit for performing introspection.

A dynamic class loading service loads new classes into the framework 24. A new class is loaded when the remote entry requests the creation of instances of a class that is not loaded into the framework 24. A new class can be loaded from a remote class server. The dynamic loading service also enables core management services to be added to a network management system agent while it is running. For example, an agent could be started without a filtering service. Then, later on, the filtering service could be added dynamically to the agent when it is required.

An access control service can be provided to control access to m-beans. Before attempting to perform a management operation on an m-bean, the framework 24 can be arranged to query the access control service to verify that the operation is valid.

An event service can be provided to receive event reports from m-beans and to forward them to any entity that has requested to receive them.

A relationship service can be provided to enable relationships between m-beans to be defined when they are required. The relationships do not need to be defined in advance. Information on the relationships between m-beans is not stored with the m-beans themselves, but can be obtained from the relationship service.

A dynamic native library loading service can be provided for loading native code into the framework 24. A native library can be loaded when a new class that includes native code is loaded. The library loaded depends on the hardware platform and operating system on which the framework is running. The native library can be loaded from a remote entity.

There now follows a description of the managed object adaptor servers 30–38.

A managed object adaptor server is a protocol adaptor that provides an abstraction of a communications protocol. Each managed object adaptor server provides access to m-beans through a particular communications protocol. A managed object adaptor server enables management applications to perform management operations on a network management system agent.

For a network management system agent to be manageable, it is connected via at least one managed object adaptor server. However, a network management system agent can be connected to any number of managed object adaptor servers, allowing it to be queried by remote management applications that use different protocols.

The network management system provides managed object adaptor servers for standard and proprietary protocols.

For example, managed object adaptor servers can be provided for one or more of the standard protocols: HTML/HTTP; SNMP; and CORBA, by way of example.

The managed object adaptor servers for standard protocols communicate directly with the management applications that use them.

For example, an HTML/HTTP managed object adaptor server enables a user to use a web browser to view management information contained in m-beans and to perform management operations on a network management system agent. The HTTP/HTML managed object adaptor server obtains management information from m-beans and generates HTML pages representing this management information.

An SNMP managed object adaptor server can be arranged to use a specially defined SNMP management information base (MIB) to enable the SNMP manager to perform management operations on a network management system agent.

The network management system can also be arranged to provide managed object adaptor servers for one or more of the following proprietary protocols: RMI; Java/HTTP; and Secure Sockets Layer (SSL). In one example of the network management system, a managed object adaptor client offers a Java API. Accordingly, any management application that uses a managed object adaptor client will be written in Java language.

Agents developed using the network management system can be managed using different communications or management protocols. To be managed using a standard management protocol, a network management system agent needs to be connected to the managed object adaptor server for that protocol. The managed object adaptor service for standard protocols communicates directly with the management applications that use them.

Figure 5:
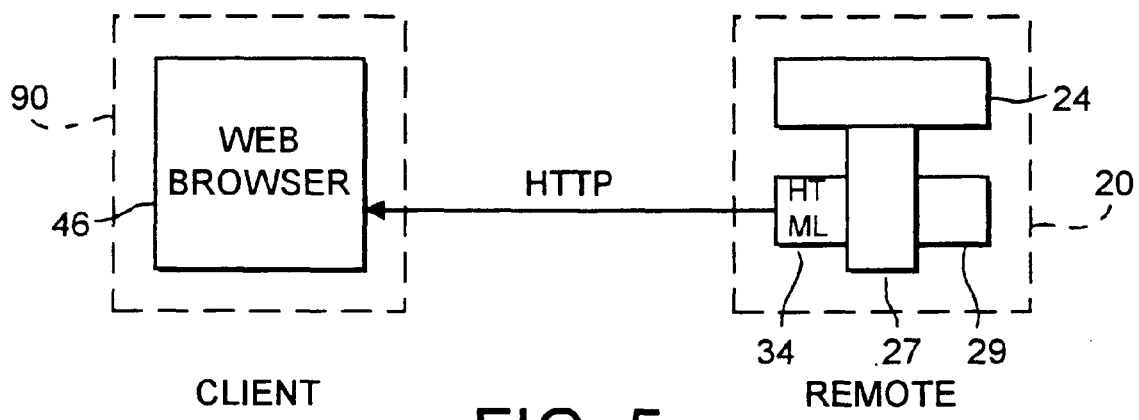
FIG. 5 is an example of a configuration for an agent.

An example of this structure, using the agent representation of FIG. 4, is shown in FIG. 5, where the agent is accessed by means of a web browser 46. Here an HTML adaptor allows beans to be mapped to an HTML page. The use of a protocol such as HTML enables the browser 46 at the client station 90 to browse beans at the remote station 20 and access and where necessary modify them using conventional web browser functions. In accordance with the structure shown in FIG. 4, the repository service 27 is registered with the framework 24, and the HTML adaptor 34 and the bean(s) 29 are registered with the repository service, whereby the bean(s) are effectively registered with an HTML page supported by the HTML adaptor 34. In FIG. 5 like reference numerals relate to like features of the arrangement shown in FIG. 4.

Figure 6:
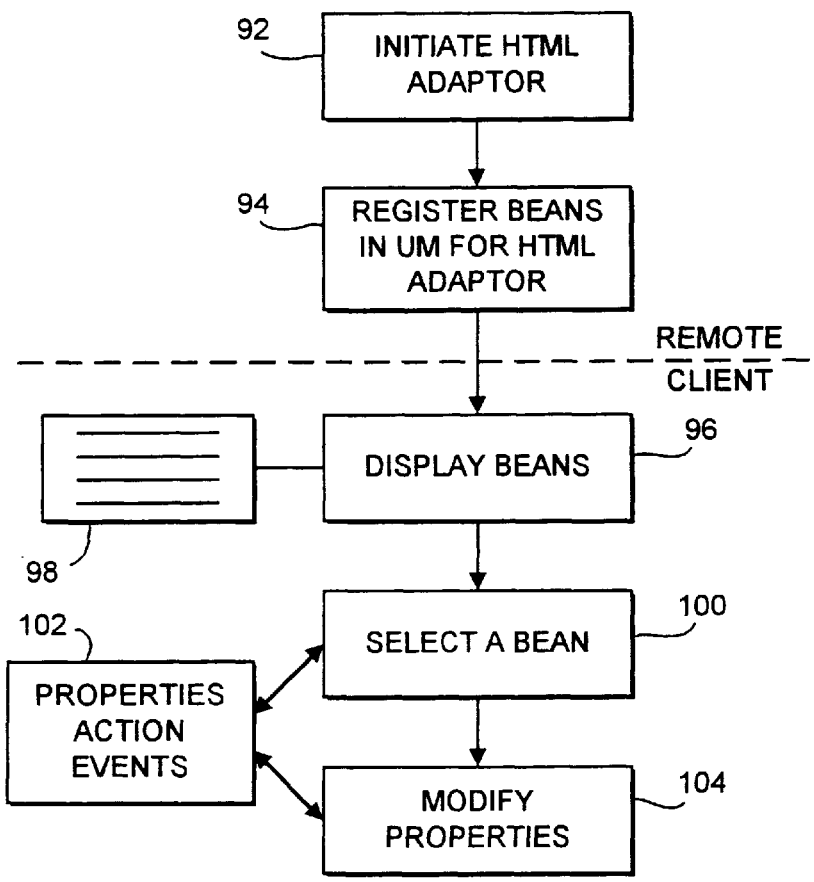
FIG. 6 is a flow diagram illustrating operations using an agent as shown in FIG. 5.

FIG. 6 is a flow diagram illustrating steps for enabling the modification of properties of the beans in the remote machine. In step 92, the HTML adaptor 34 is initiated in the virtual machine 22 at the remote station 20 and in step 94 the bean(s) 29 of that virtual machine which are to be accessible remotely are registered with the framework, or more particularly with the repository service 27 as described above. This means that when the HTML adaptor queries the framework 24, the framework 24, with reference to the repository service, is able to identify the beans 29 to be accessed and to permit access thereto by the HTML adaptor.

The HTML adaptor 34 allows communication over the network using conventional HTTP exchanges. It behaves as an HTTP server. When it receives a request, it dynamically generates a page containing a list of beans (objects) 29 currently registered with the repository object 27.

A bean is represented in HTML as an HTML table wherein:

a first column contains a property name;

a second column contains a property type;

a third column contains the access right (read/write);

a fourth column contains a property value.

As mentioned above, if the property is read/write, an HTML form is generated.

In step 96, the beans are displayed at the client station (represented by display 98) using the HTML representation of a bean as described above by accessing the HTML page using a conventional web browser which communicates with the HTML adaptor using HTTP exchanges. The user is able then to select, at step 100, a bean using conventional web browser functions. The web browser will then issue an HTTP GET request to the HTML adaptor 34. The HTML adaptor employs introspection to extract the bean properties and then returns an HTML post response to the browser, whereby the browser may display the properties, and possibly also the actions and events supported by the bean, as represented at 102. By further use of the browser using conventional browser functions, the user is able to select and specify modifications to aspects of the bean, for example changes to the properties. By a further exchange of HTML GET and/or SET requests and POST responses, the web browser and the HTML adaptor are able to modify, at step 104, the corresponding properties of the bean at the remote station and to display these changes to the user at the client station.

Thus, this mechanism provides a computer-implemented method of accessing from a client machine an object such as a bean at a remote machine via a telecommunications network by mapping the object to an externally accessible machine page at the remote machine and browsing the object via the machine page using a browser.

Figure 7:
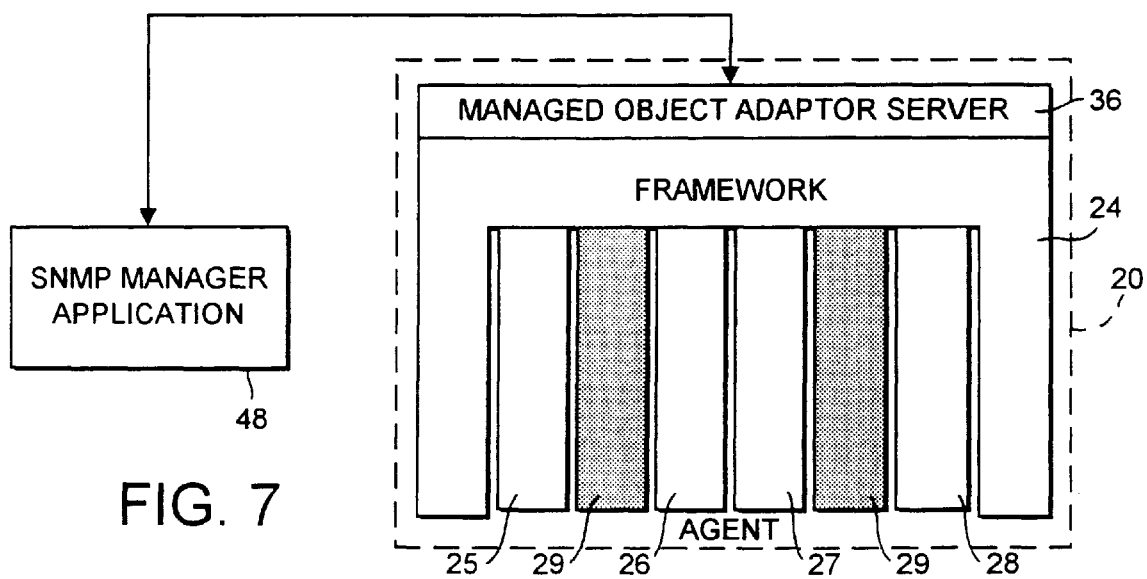
FIG. 7 is an example of a configuration of a management system.

Another example of the structure shown in FIG. 3, this time using the representation of FIG. 3, is shown in FIG. 7, where a network management system agent 20 is managed by an SNMP manager application. In FIG. 7 like reference numerals relate to like features of the arrangement shown in FIG. 3.

Figure 8:
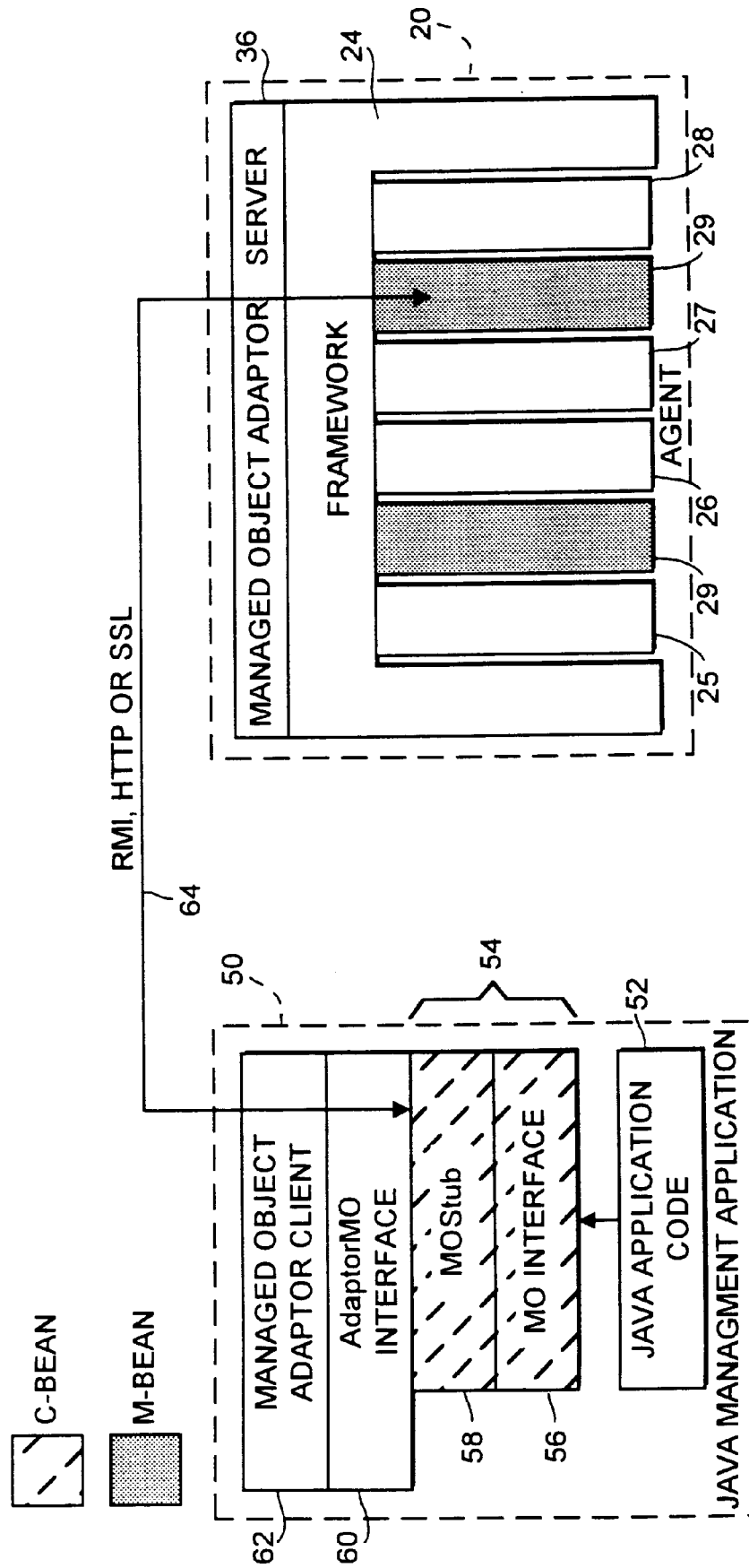
FIG. 8 is another example of a configuration of a management system.

An example of a network management system represented in FIG. 8 provides an adaptor API to enable Java management applications to communicate with the network management system agents. The adaptor API provides managed object adaptor clients for accessing managed objects through a particular communications protocol. The network management system defines a representation of m-beans for Java management applications and provides a compiling tool for generating such a representation automatically from an m-bean. A name service is supplied to allow Java management applications to be independent of a particular communications protocol.

A managed object adaptor client is an abstract Java class that enables Java management applications to access managed objects. The programmatic representation of the managed object to the Java management application is determined by the managed object adaptor client. Such a mechanism allows different representations of the same managed object to be presented to different Java management applications. The network management system provides managed object adaptor clients for accessing managed objects through one or more of the following protocols: RMI; HTTP; and SSL.

The managed object adaptor clients provide a definition of an adaptor managed object interface. The adaptor managed object interface enables Java management applications to perform one or more of the following management operations on a network management system agent:

retrieve m-beans;

get or set the properties of remote m-beans;

call methods of remote m-beans;

create instances of m-beans;

delete m-beans; and receive events emitted by remote m-beans.

A managed object adaptor client provides a Java management application with "handles" on managed objects in a remote agent. These handles enable the Java management application to manipulate the managed objects directly. The Java management application does not need information on the protocol used by the managed object. All the Java management application needs is the class of object that the managed object represents. For example, a Java management application for handling accounts uses an abstract class for representing accounts. To manipulate an account, the Java management application obtains an account managed object from the managed object adaptor client. It then casts the account managed object into the abstract class that represents the account. In this way, the application code is independent of how the managed object is implemented.

FIG. 8 is a schematic representation of the relationship between a client bean (c-bean) 54 and an m-bean 28. A c-bean 54 is a representation of an m-bean to a Java management application. In the preferred embodiment of the invention, a c-bean 54, like an m-bean 28, is implemented as a JavaBeans component. A c-bean 54 defines how a Java management application accesses an m-bean 28.

As seen in FIG. 8, a c-bean 54 comprises a managed object interface (MO interface) 56 which defines which of the methods of an m-bean are accessible to a Java management application, and a managed object stub (MOStub) 58 that implements the methods defined in the MO interface 56.

A Java management application obtains a reference to a c-bean by using an adaptor MO interface 60. The adaptor MO interface instantiates the c-bean 54. The same implementation of a c-bean 54 can run on any managed object adaptor client that implements the adaptor MO interface 60. Different implementations of the same managed object can be presented to different Java management applications. Therefore, a single m-bean can be associated with several c-beans 54.

A Java management application performs management operations on an m-bean by calling methods of its associated c-bean 54. To the Java management application, a c-bean 54 is a local representation of the remote Java object (an m-bean 28).

The adaptor MO interface 60 instantiates the c-bean 54. The same implementation of a c-bean can run on any managed object adaptor client 62 which implements the adaptor MO interface 60. Different representations of the same managed object can be presented to different Java management applications. Thus, a single m-bean can be associated with several c-beans.

A Java management application performs management operations on a m-bean by calling methods of its associated c-bean. To the Java management application, a c-bean is a local representation of a remote Java object (an m-bean).

Figure 9:
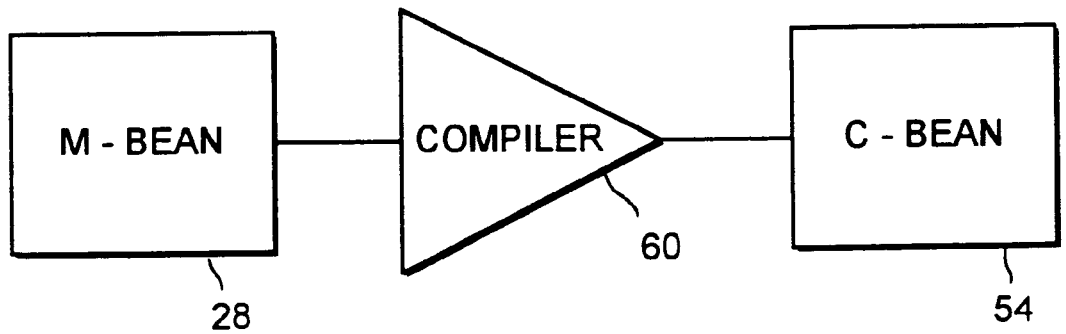
FIG. 9 illustrates an aspect of the creation of the configuration of FIG. 8.

FIG. 9 is a schematic representation of the generation of a c-bean 54 from an m-bean. In an embodiment of the invention a c-bean is generated automatically from an m-bean 28 using the Reflection API. The generated c-beans exhibit the same properties, methods and events as the m-beans. This is the case, for example, where no access control policy is enforced.

In order to provide the automatic generation of a c-bean 54 from an m-bean 28, a compiler 60 takes as an input the m-bean 28 and generates as an output the MO interface and MO stubs of a c-bean 54. For example, when an m-bean 28 representing a Java class named account is compiled, the compiler 60 generates an MO interface 56 named accountMO and a Java class named accountMOSTUB 58, which implements the accountMO interface 56.

A Java management application can be developed using the MO interface definitions. By loading different stubs, the adaptorMO interface can modify the behaviour of the Java management application at run time. For example, if read-only stubs are loaded, the Java management application will not be able to modify the properties in the m-bean 28.

The compiler 60 can generate read-only or read-write stubs. The generated stubs make use of the adaptorMO interface. Therefore, their behaviour is the same on any managed object adaptor client that implements the adaptorMO interface, regardless of the implementation of the managed object adaptor client.

Figure 10:
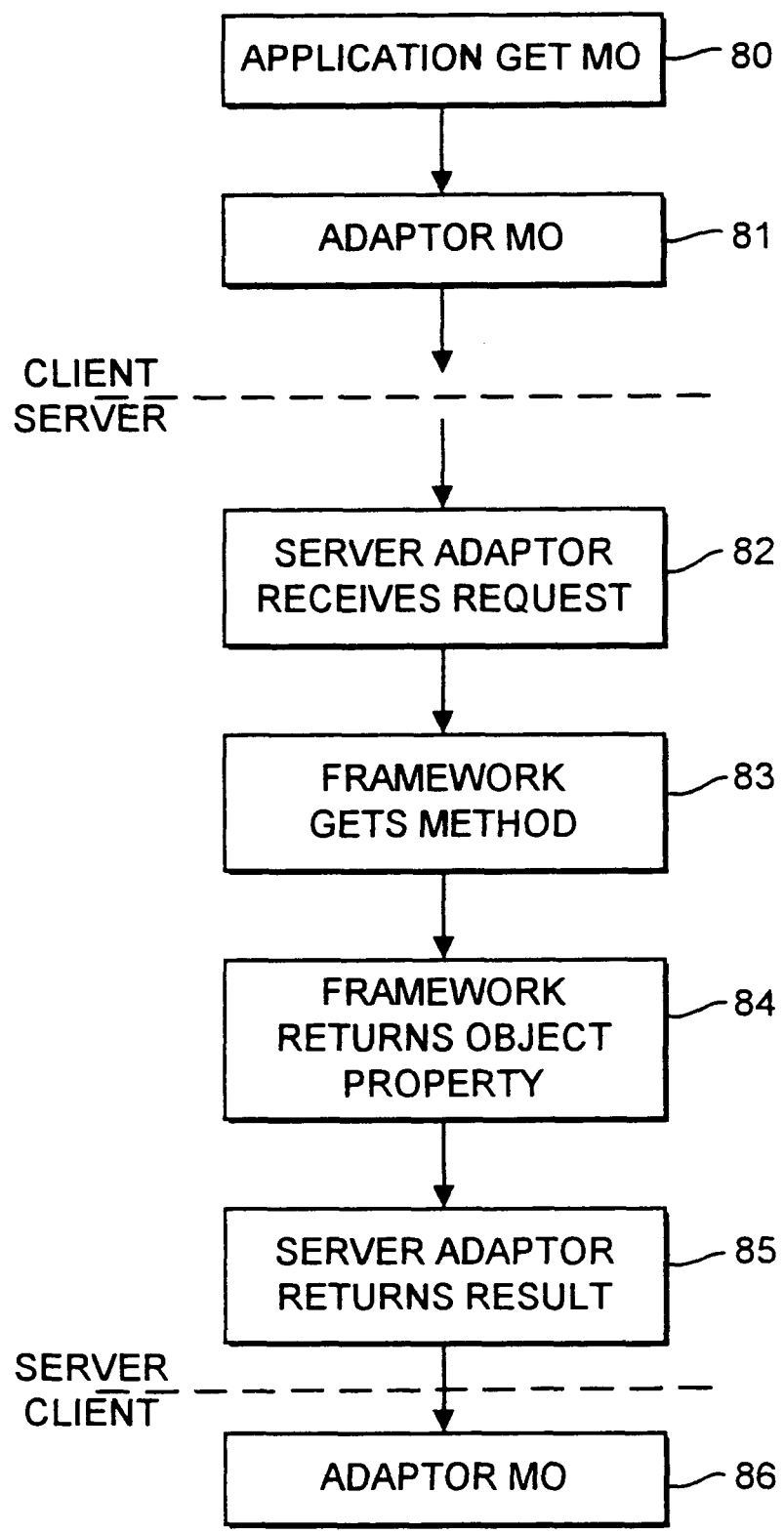
FIG. 10 is a flow diagram illustrating operations of the system of FIG. 8.

FIG. 10 is a block diagram of steps for accessing a bean at a remote (server) station from a local management (client) station using a structure as shown in FIG. 8.

The management application (e.g. a Java management application) at the management station generates, at step 80, a get request to the adaptorMO at the client station. The adaptorMO, with the Mostub and the network adaptor at the client station generate, at 81, a request in accordance with an appropriate network protocol (e.g. HTTP).

Thus the request sent via the network to the managed system could, for example, be in the form of a GET request for a management property of a managed object.

The appropriate managed object adaptor server 30–38, depending on the protocol used, receives the external request at step 82. It will then access, at step 83, the framework 24 to get an appropriate method. The framework gets, at step 83, a managed object method for the request and returns, at step 84, the management property of the managed object to the adaptor, which in turn returns, at step 85, composes a return message with the result in accordance with the same network protocol (e.g. HTTP). The result message is received, at step 86, at the client adaptor and adaptorMO, which returns the result to the management application.

Figure 11:
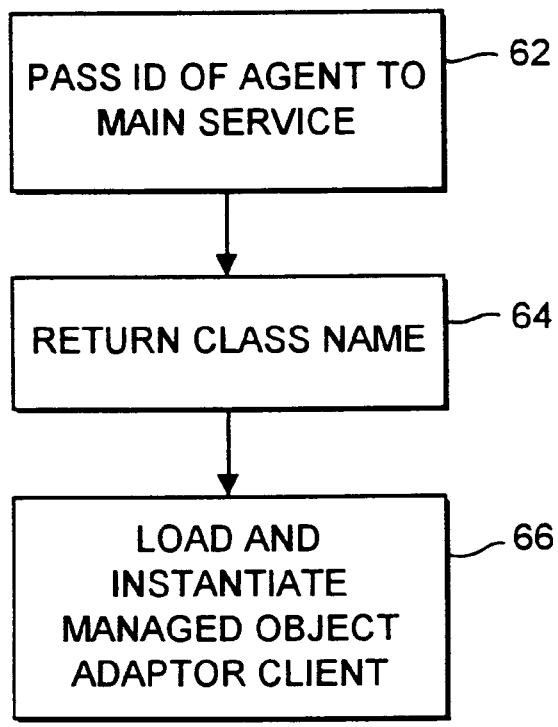
FIG. 11 is a flow diagram illustrating the operation of a naming service.

A name service is provided which allows management applications to be independent of a particular communications protocol. Java management applications use the name service to determine which managed object adaptor client to use for accessing an agent. FIG. 11 is a schematic flow diagram illustrating the operation of the name service.

In step 62, the management application passes the identity of the agent to be accessed to the main service.

In step 64, the name service returns the class name of the managed object adaptor client, for example sunw.jaw.moa.rmi in the case of an agent access through the Java RMI system.

In step 66, the Java management application uses its default class loader to dynamically load the managed object adaptor client and instantiate it. The Java management application can then interact with the agent through the managed object adaptor client, regardless of the communications protocol.

As mentioned above, a management bean, or m-bean is a managed object in a network management system agent. A managed object is a software abstraction of a resource that is controlled and monitored by the agent. In an example of a network management system, all m-beans are implemented as JavaBeans components. They can be accessed using a conventional Java application builder, such as the Java Beans Development Kit. Within an m-bean, it is possible to call and use services provided by the network management system.

A JavaBeans component includes properties which form discrete, named attributes which can affect the appearance or the behaviour of the JavaBeans component. For example, an m-bean representing an Ethernet driver might have a property named Ipackets that represents the number of incoming packets. Properties can have arbitrary values, including both built-in Java end types and class or interface types such as Java.awt.color. Properties are always accessed via method calls on the object that owns them. For readable properties there is a get method to read the property value. For writeable properties, there is a set method to allow the property value to be updated.

A default design pattern can be used for locating properties:

public PropertyType get PropertyName();
public void set PropertyName (PropertyType value);

If a class definition contains a matching pair of get PropertyName and set PropertyName methods with the return type of the getter corresponding to the parameter type of the setter, then these methods define a read-write property. If a class definition contains only one of these methods, the name defines either a read-only or write-only property called PropertyName.

In addition for Boolean properties, it is possible to define a get method using the following design pattern:

public boolean isPropertyName();

The isPropertyName method may be provided instead of a getPropertyName method where it may be provided in addition to a getPropertyName method.

An index property is an array PropertyElement[], that is accessed by methods of the form:

public PropertyElement getPropertyName (int index);
public void setPropertyName (int index, PropertyElement b).

If a class definition contains either kind of method, PropertyName is an index property. These methods can be used to read and write a property value. These methods can be defined in addition to the methods defined for simple properties. Therefore, an index property can be represented by four accessor methods.

By default, the following design pattern is used to determine which events an m-bean can multicast:

public void addEventListenerType(EventListenerType a);
public removeEventListenerType(EventListenerType a);

Both of these methods take the EventListenerType type argument, where the EventListenerType type extends the java.util.EventListener interface, where the first method starts with add, the second method starts with remove, and where the EventListenerType type name ends with Listener.

This design patent assumes that the Java bean is acting as a multicast event source for the event specified in the EventListenerType interface.

To conform to the JavaBeans model, all public methods of a JavaBeans component should be exposed as external methods within the component environment for access by the components. By default, this includes property accessor methods, and in the event listener registry method.

In addition to the JavaBeans component model for design pattern elements, the network management system can define an action as a public method of an m-bean that makes sense to be called remotely. Action facilitates the differentiation of an m-bean public method which is exposed for other local m-beans from public methods that can be called remotely. The design pattern for an action is as follows:

public AnyJavaType performAnAction (AnySignature);

M-beans can contain native libraries, that is a library not written in the language (e.g. Java) of the m-bean. The network management system can provide a mechanism for loading a native library from the same remote class server as the m-beans. To enable an m-bean to use this mechanism, a static loadLibrary method of the Framework class can be called in which the caller includes a reference to the Java class of the caller. Such information is used by the framework 24 for identifying the class loader by which the class is loaded.

The core management services mentioned above are for many of the management operations common to all agents, thereby simplifying the development of agents. By providing these core services, the network management system enables efforts to be concentrated on developing those parts of an agent which are specific to a particular application, namely the m-beans and the applications to control and manage them.

Figure 12:
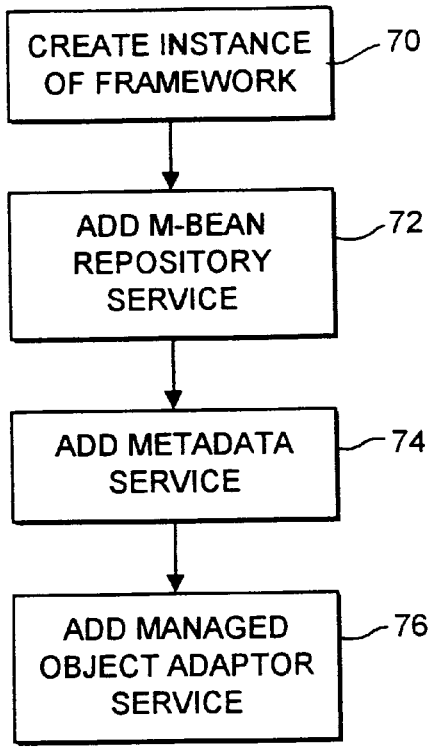
FIG. 12 is a flow diagram illustrating the operation of the creation of a generic agent.

FIG. 12 is a schematic flow diagram of the initialisation of a network management system agent 20. The initialisation process comprises:

in step 70, creating an instance of the framework 24;
    in step 72, adding the m-bean repository service 27;
    in step 74, adding the metadata service 29; and
    in step 76, adding at least one managed object adaptor server (30–38) so that the agent can be access by management applications.

Once the network management system agent 20 has been initialised, no further management services need to be added before an agent is started. These can be added dynamically to the agent while it is running.

The framework 24, controls the management services and m-beans of an agent 20 developed using the network management system. In the preferred embodiment it is implemented by the Java class java.jaw.agent.cmf.Framework. An agent must contain one instance of the framework, that is, in the preferred embodiment, one instance of the java-.jaw.agent.cmf.Framework class.

In the preferred embodiment, m-beans can be managed only if they are registered with an object name in the m-bean repository 27 of the agent 20. Accordingly, the m-bean repository service 27 is added in step 72 before the agent 20 becomes operational. The m-bean repository service 27 is used for storing and retrieving the association between an m-bean and its object name. The m-bean repository service of the preferred embodiment is defined as the Java interface java.jaw.agent.services.MoRepSrvIf. An agent can only be associated with the one m-bean repository service at any one time. However, it is possible to change the m-bean repository service with which the agent is associated while the agent is running.

The m-bean repository can be implemented as a volatile storage or as a persistent storage. In a volatile repository, all the information on m-beans is stored in memory. All of the information in a volatile repository is lost when the agent is stopped. Accordingly, when an agent is started, with a volatile repository, it has to reload the information in the repository. With a persistent repository, all the information on m-beans is stored in a database whereby the information in a persistent repository is not lost when the agent is stopped. It is also possible to implement a mixed repository whereby information on m-beans is stored in memory or in a database.

The metadata service referenced above is used to obtain the properties and actions supported by an m-bean. A preferred implementation of the metadata service is based on the Reflection API provided by the known Java Development Kit for performing introspection.

As mentioned above, at least one managed object adaptor service should be running in the server virtual machine as the network management system agent. The network management system does not require a managed object adaptor server to conform to a specific interface definition or implementation. The managed object adaptor server is arranged to access the framework 24 to retrieve and change information contained in the agent. The managed object adaptor servers provided are implemented as m-beans. Examples of managed object adaptor servers have been described above. In the preferred embodiment of the invention, the managed object adaptor servers are implemented as appropriate Java classes.

For example, an RMI managed object adaptor server can be implemented as a Java class sunw.jaw.agent.adaptor.rmi-.AdaptorServerImpl. It enables Java management application to access an agent using the Java remote method invocation (RMI) system. As described above, a Java management application accesses this server through a managed object adaptor client implemented as the Java class sunw.jaw.agent.adaptor.rmi.AdaptorClient.

Core management services can be added to an agent while it is running, once the agent has been initialised as described above. It is possible to add a core service to an agent in either of the following ways:

directly calling a set method for the service within the Framework class;
    adding the service to the m-bean repository in the same way as for an m-bean.

Adding a core management service directly gives faster performance than adding a core management service to the m-bean repository. This is because the framework does not need to query the m-bean repository in order to obtain the service. However, certain restrictions can apply to a core management service that has been added directly:

the service is not visible to remote applications; and
    it is not possible to store information on the service in persistent storage.

Accordingly, where it is desirable for a core management service to be visible to remote applications, it is necessary to add the service to the m-bean repository. If it is desired to store information on a core management service in persistent storage, it is also necessary to add the service to the m-bean repository. The m-bean repository to which the service is added, must support persistent storage.

A Class Service Name contains names by which the framework 24 identifies the services that are implemented for an agent. The framework 24 retrieves the service it requires as follows:

1. The framework 24 checks if a service has been defined using a direct set method. If a service has been defined in this way, the framework 24 uses this service.
2. If the service has not been defined using a direct set method, the framework queries the m-bean repository to obtain all the m-beans that are instances of the class that implements the service. For example, for the metadata service, the framework 24 queries the m-bean repository to obtain all the instances of the class named Service-Name.META.

if the repository contains several instances of the class, the framework 24 uses the first instance returned by the m-bean repository.

if the m-bean repository contains no instances of the class, the framework throws a ServiceNotFound Exception.

Various operations can be performed in a network management service agent. For example, an object in an agent can use core management services for:

instantiating m-bean;

registering m-beans with the m-bean repository;

retrieving m-beans from the m-bean repository;

getting and setting the values of properties within m-beans; and defining relationships between m-beans.

An object name uniquely identifies an m-bean. Management applications use object names to identify the m-beans on which to perform management operations. Any naming scheme could be used. For example, in the preferred embodiment of the invention, a naming scheme defined by Microsoft Corporation for the Hyper Media Management Scheme (HMMS) could be used.

In order to instantiate an m-bean, one of the following methods of the Framework class can be called:

newObject to user default storage mechanism for storing the m-bean;

newDBObject to specify the m-bean is persistent.

With either of these methods, it is necessary to provide:

the Java class of the m-bean to be instantiated; and the object name to be used for registering the m-bean.

By default, the framework 24 uses the default class loader to locate the Java class of the m-bean to be created. It then creates an instance of the class. Once the m-bean has been instantiated, it is initialised and registered so that it is accessible to the framework 24. It is possible to initialise and register an m-bean by using:

a method defined in the m-bean itself; or the framework 24.

For initialising a register of an m-bean using a method defined in the m-bean itself, the Java class definition of the m-bean should contain:

an initialisation method;

the code required to enable the m-bean to register itself with the m-bean repository.

Once the m-bean has been instantiated, the framework 24 uses the metadata service 27 to find the initialisation method in the newly created m-bean. If such a method is present in the m-bean, the framework 24 calls it giving:

a reference to itself as a first parameter;

the object name for use in registering the m-bean as a second parameter.

The m-bean is therefore able to register itself with the m-bean repository using the code provided.

If an m-bean is not provided with the initialisation method, the framework initialises and registers the m-bean using functions provided for this purpose.

Registering a JavaBeans component with the m-bean repository 25 enables the component to be managed by the agent 20. Registering the JavaBeans component does not require modification of code within the JavaBeans component itself. Instead, all that is required is the addition of code for registering it in the m-bean repository. Therefore, it is possible to register any existing JavaBeans component in the m-bean repository. Once registered, the agent 20 manages the JavaBeans component in the same way as any m-bean. When an m-bean is registered, it is assigned an object name. An object name can be explicitly specified. If an object name is not explicitly specified, the framework 24 assigns a default name to the m-bean.

The network management system provides services for retrieving m-beans from the m-bean repository. These services enable the retrieval of m-beans using:

pattern matching on the object name; or queries (filters) on the Java properties they contain.

By using pattern matching on the object names of m-beans, it is possible to retrieve:

a specific m-bean using its full object name;

a set of m-beans sharing the same logical class as expressed in the object name;

a set of m-beans sharing the same domain name; or all the m-beans contained in an agent.

Using queries enables the retrieval of m-beans according to Java properties and their values within m-beans. The m-bean repository evaluates properties if it is able to do so. Otherwise the framework evaluates queries itself. To determine whether a repository is able to assess queries, the framework causes a query method for this purpose.

The network management system provides services for getting and setting properties of m-beans. If the agent provides a metadata service, in a call to the get or set method of the m-bean, all that needs to be supplied are:

the name of the property to be retrieved or set;

the object name of the m-bean that contains the property.

If the agent does not provide a metadata service, it is still possible to call directly to the get or set method of an m-bean. In this case it is also necessary to supply to the caller the name and signature of the method to call.

A relationship service enables relationships between m-beans to be defined when they are required. The relationships do not need to be defined in advance. Information on the relationships between m-beans is not stored with the m-beans themselves, but is stored with the relationship. A relationship needs to be registered with the m-bean repository. A relationship is defined by:

a set of roles, for example in an ownership relationship a person owns a book and a book is owned by a person;

a degree which corresponds to the number of required roles in a relationship.

The m-beans involved in a relationship are referred to in a relationship by their object names. A specific class loader can be added to the agent at start-up or while the agent is running. It is possible to have several class loaders within the same agent, provided that they are all registered with the m-bean repository. When the creation of a new object is requested, it is possible to specify the class loader to be used for loading the object. In this case the class loader is identified by its object name. The system provides several implementations of a network class loader, each implementation using a different protocol and requiring a different class server.

The system provides event handling services for filtering, logging and forwarding events through different communications protocols. To emit an event, a send event method is called. When this method is called, the framework 24 retrieves all the m-beans corresponding to an event handling service and calls an event handling method of each event handler retrieved. This method is responsible for handling the events.

FIG. 9 is a schematic representation of the compiling of a c-bean 54 from an m-bean 28. The compiler 60 implements one translation scheme for generating c-beans. It is, however, possible to implement different translation schemes depending on the requirements.

Figure 13:
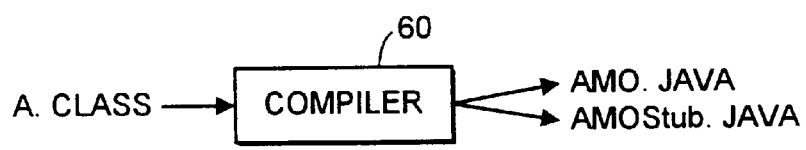
FIGS. 13 and 14 illustrate alternative operations of a compiler.
Figure 14:
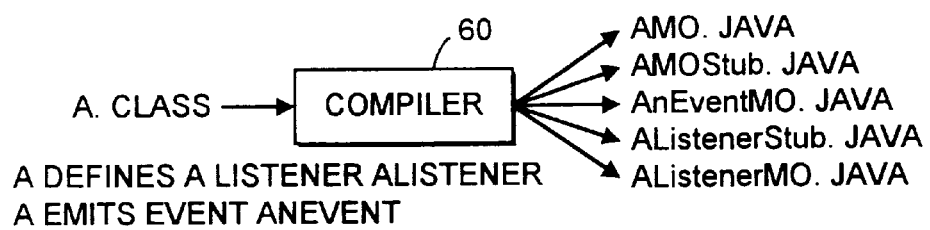

FIG. 13 illustrates an example of the output of the compiler 60 for compiling a single m-bean called A. FIG. 14 shows the output of the compiler 60 if a compiled m-bean includes aListener for a specific event AnEvent.

Thus, if the m-bean contains listeners, the compiler 60 generates:

- a Java interface for the listener to be included in the MO interface;
- a listener stub which is an implementation of the m-bean listener for catching m-bean events and forwarding them to the framework 24; and
- a Java management application's view of the event associated to the listener referred to as EventMO.

The compiler 60 parses an m-bean using the applicable design parameters. After parsing, the compiler 60 uses a number of rules for generating the c-bean.

Each property of the m-bean will be present in the c-bean with the same accessor methods. So, if a property is read-only in the m-bean, the property will be read-only in the c-bean.

FIG. 15A is an illustration of a simple c-bean which is generated when compiling an m-bean defined by a code example shown in FIG. 15B. In addition, the compiler 60 generates a file containing an implementation of the Simple MO interface.

In addition to the property accessors, the compiler 60 generates code only for public methods for which it makes sense to provide remote access. Other public methods do not appear in the c-bean generated by the compiler 60.

FIG. 16A shows a subset for an action method in a c-bean of the MO interface which the compiler 60 will generate when compiling the action method in an m-bean defined as in FIG. 16B.

If an m-bean contains a listener called A, the compiler 60 includes a listener called AIfMO in the c-bean.

When using the c-bean, an application will have to implement the Aifmo interface to add or remove the listener in the c-bean. Generally, a listener is an interface containing a certain number of methods. Each method has one input parameter. The input parameter extends an event object concerned.

In an example, each method defined in listener A refers to an event object which, for the purpose of this example is called AnEvent. Accordingly, in the Aifmo interface, the event object is called AnEventMO. Thus, for a listener A, the compiler 60 generates files:

Aifmo.java;

AnEventMO.java.

In addition, the compiler 60 generates an implementation of listener A named AStub.java.

Codes generated by the compiler 60 complies with the design parameters designed by the JavaBeans component model. Accordingly, the objects generated by the compiler 60 can be integrated in development environments that comply with this model. In addition, the compiler 60 adds some public methods which do not follow the design patterns defined by the JavaBeans component model. The added methods are designed to limit the network traffic between an m-bean and a c-bean. For example, by calling one function on a c-bean, it is possible to read all the properties of the corresponding m-bean.

The compiler 60 generates Java source code. It is possible to edit the generated code and modify it to define a specific view of an m-bean. Instead of modifying both the interface and the stub, it is better to keep the interface and modify only the stub. The code generated by the compiler 60 enables an application to be built using the interface. At one time the behaviour will change depending on which stubs are loaded by the adaptorMO. For instance, the compiler can generate read-only or read-write stubs for the same interface. Accordingly, an m-bean browser can be developed based on the interface. As mentioned above, the browser will thereby have a different behaviour depending on whether the read-only or read-write stubs are loaded.

The adaptorMO interface is a Java interface defined for managing the agent 20. The network management system provides several implementations of the adaptorMO interface based on different communications protocols, as described above. However, the adaptorMO interface is protocol independent. Accordingly, any piece of code written using the interface can run on any of the implementations provided by the network management system.

Within the adaptorMO interface there are two different levels. A low level where remote objects (m-bean) are manipulated using their names, and a high level where remote objects (m-bean) are manipulated using a local view (c-bean) of the remote objects. The high level is built on top of the low level interface.

Using the low level interface is practical for building generic applications (such as an HTML object viewer or MIB browser). Using the high level interface is much easier than using the lower level interface. However, it means that the application knows the semantic of the c-beans it manipulates. In addition, it requires the application (or the adaptorMO interface) to have access to MOs and MOStubs. A first step in initialising an adaptor consists of initialising an implementation of the adaptorMO interface.

In order to initialise an adaptor, the client applications invokes a "connect" method defined in the adaptorMO interface. Parameters are provided which relate to the host name of the agent, the port number to use and a logical name which is generally dependent on the underlying communication mechanism. The different piece of information could be obtained from a name server or directory service at the same time the implementation name of the adaptor to use is given. Depending on the underlying communication mechanism used by the adaptorMO interface, the call to "connect" might not involve any message exchange between the client and agent.

An adaptor makes use of:

- a name server for getting the Java class name for use for representing a specific m-bean (known through its object name);
- a class loader for loading c-beans.

If all the Java classes for the c-beans are present on the machine where the client application is running, there is no need to use a specific class loader. Otherwise, it is possible to use a network class loader for getting the classes over the network.

For using a network class loader, a client application needs to instantiate the network class loader. When instantiating the object, the application provides an object name.

The object name can contain any domain and any class name. However, the object name should contain the following key properties:

host (the host name where the class server is running);
port (the port number to use);
service (the name of the RMI service to invoke).

Once an adaptor is initialised, the application is ready to perform management operations on the remote agent. An application can retrieve a subset or all of the m-beans managed by an agent. When retrieving objects, an application can specify queries. The results of the retrieval can be obtained under two different schemes:

a list of object names (represented by a Vector);
a list of c-beans (for each object name retrieved the adaptor will instantiate a c-bean).

In order to read a property of a remote m-bean, the property name is needed when using the low level adaptorMO interface level. When using the high level interface, the c-bean is retrieved and then a getter associated to the property is invoked.

Setting a property of a remote m-bean, a property name and the property object type is required when using the low level adaptorMO interface level. When setting a value, it is possible to specify the name of an operator class. On the agent side, the specified operator is instantiated and invoked for setting the property value. When using the low level adaptorMO interface level, it is possible to set several properties through one method call using a list of modifications.

When using the high level adaptorMO interface level, a c-bean is obtained and the developer then invokes the set associated to the property.

Through the adaptorMO interface, it is possible to request instantiated of m-beans within a remote agent. When requesting the instantiation, it is possible specify a new class loader through which the agent is supposed to load the new class to instantiate. The class loader can be specified using its object name. If no class loader is specified, the agent uses the default class loader. When instantiating a remote m-bean, it is possible to directly obtain a c-bean for representing the newly created m-bean. If no name is provided and if a name server is specified, the adaptor queries the name server in order to obtain the name of the Java class to instantiate on the agent's side. Otherwise, it is the responsibility of the agent to determine the class name of the class to instantiate. When instantiating an m-bean in the agent, it is possible to explicitly request the object to be persistent.

Through the adaptorMO interface, it is possible to transfer Java objects from the client to the agent. In order to do this, the adaptorMO interface serialises the object, sends the object over and deserialises the object in the agent.

Through the adaptorMO interface, it is also possible to remove an m-bean object from the remote agent. The m-bean is not removed from the virtual machine, but only from the object repository of the agent.

Figure 17:
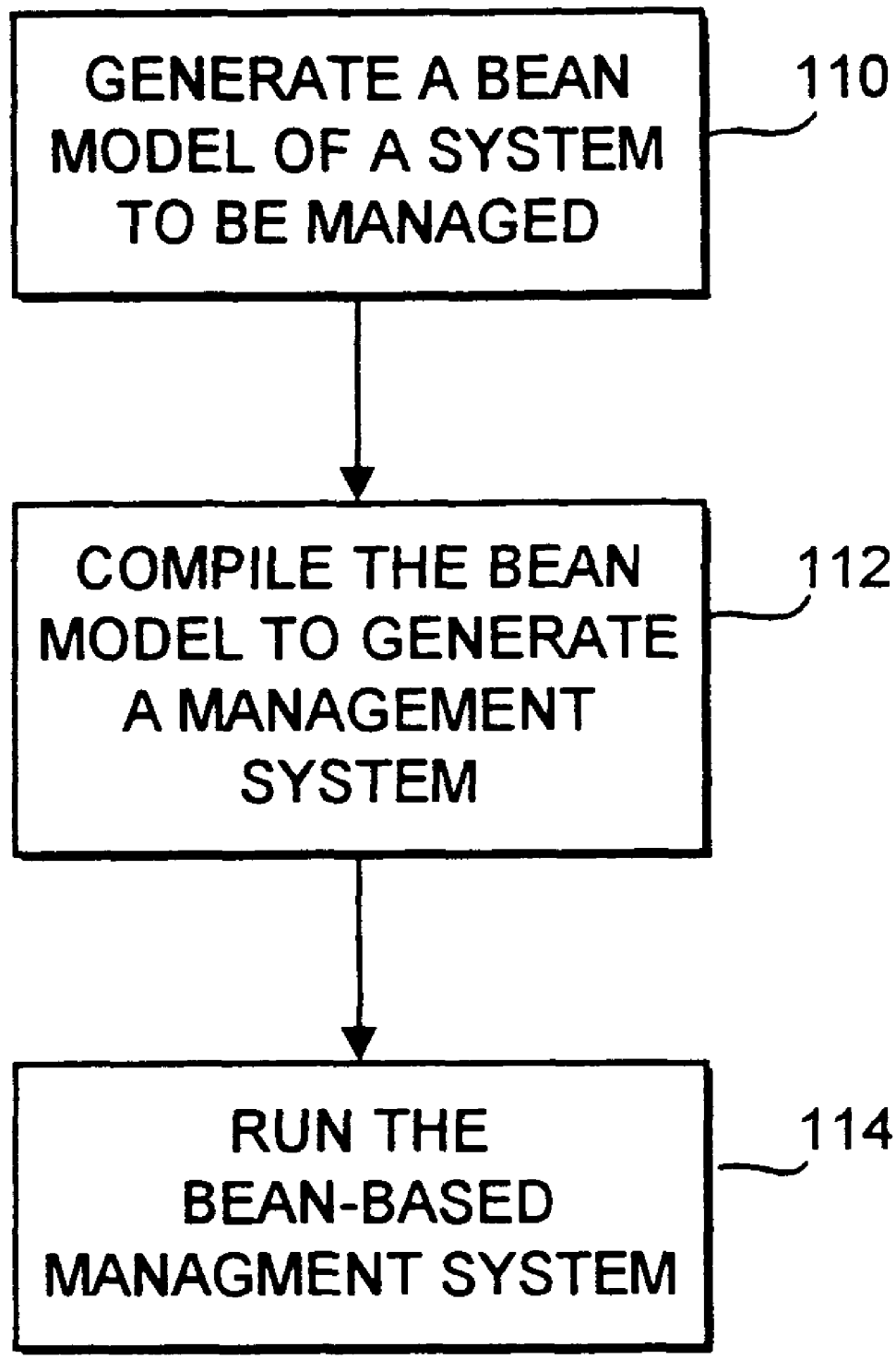
FIG. 17 is a flow diagram illustrating steps in generating a management system.

FIG. 17 is a flow diagram giving an overview of the steps in creating and operating a management system as described above including steps of defining a network management model including at least one management bean using a bean-based environment and compiling said model to implement said computer network management system in said bean-based environment.

In step 110, a model is created using a bean-based environment. A preferred bean-based environment is Java environment with the beans being JavaBeans.

As mentioned above, beans provide a set of properties, a set of methods for performing actions, and support for events and for introspection. Conventionally, the properties allow beans to be manipulated programmatically and support customization of the bean, the methods implement the properties and the support for events enables beans to fire events and define the events which can be fired. The support for introspection enables the properties, events and methods of the bean to be inspected from externally.

Accordingly, step 110 includes generating at least one said management bean providing at least one property for modelling a property of a managed resource, and/or a method for modelling an action for said managed resource and/or support for at least one event for modelling an event of said resource and/or support for introspection permitting external analysis of the composition of said bean. This step also includes defining the relationship and interactions between management beans as representative of the relationships and interactions between the managed resources. This step can also include defining at least one listener event in respect of at least one management bean.

It is recognised for the first time in respect of the present network management system that beans can be used beyond their conventional role to provide a management vehicle (management bean) for directly modelling resources to be managed. For example, a property in a management bean can be used for modelling a property (e.g. a resource attribute such as the size of a memory, the number of messages received in a buffer, etc) of a managed resource. A method of a management bean can be used for modelling an action (e.g. a system rest) of a managed resource. A bean can also be used to provide support for an event (for example a disk full event) for a managed resource. For example, a management bean can provide support for a listener event, whereby one management bean can be responsive to an event on another management bean. By means of the support for introspection a management bean can permit external analysis of the composition of the bean and the exchange of information between beans. Management beans can include definitions of relationships and interactions between management beans as representative of the relationships and interaction between the managed resources.

As beans are reusable software components which can be manipulated visually in a builder tool (e.g. an editor or graphical user interface builder (GUI builder)), in step 110 a user can use a conventional builder tool, such as the JavaBeans Development Kit, for generating the management system model including beans defining system resources, their functions and the relationships between and interactions of the system resources. The bean model is defined within a virtual machine forming the bean-based environment, for example a model using JavaBeans within a Java virtual machine. This greatly facilitates the generation of the management system model. Verification and debugging of the model can be readily performed using introspection and other techniques.

In step 112, once the model has been generated, the model can be compiled directly using a conventional compiler for the bean-based environment, for example the compiler 60 shown in FIG. 9. By defining a model in a bean-based environment, it is possible directly to compile the bean-based model to form a bean-based implementation using a standard compiler for the bean-based environment, for example by compiling the JavaBeans using a Java compiler. Accordingly, the resulting bean management system is also defined within the same Java environment. This greatly simplifies this stage of the generation of management system as the compiler forces a reliable and homogeneous implementation of the model.

At runtime, therefore, in step 114, the management system described earlier in this document provides a robust and readily modifiable structure, without the difficulties and disadvantages of prior network management system.

Step 114 includes the steps described in respect of FIG. 12 of registering one or more management bean(s) with the extensible agent framework; registering one or more network adaptor(s) (e.g. network adaptor bean(s)) for a network communications protocol with the extensible agent framework; and enabling external access via the network to the management bean(s) via the network adaptor(s).

As described with respect to FIG. 12, the extensible agent framework can include an associated repository bean and the steps of registering one or more management bean(s) and/or network adaptor(s) can comprise registering one or more management bean(s) and/or network adaptor(s) with the repository bean.

The generation of a network management system has been described including composing a network management model using a bean-based environment and then compiling the model to implement the computer network management system in the bean-based environment. The beans are directly able to model the characteristics of components of a system to be modelled. The beans can also be compiled directly to provide the implementation of the model. As a result, the need for a separate environment for modelling a management system from that used to implement that management system can be avoided.

Accordingly, it will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

What is claimed is:

1. A computer-implemented method of generating a computer network management system comprising steps of:
   a) defining a network management model including at least one management bean using a bean-based environment, wherein said at least one management bean corresponds to a resource that is controlled and monitored by an agent, wherein said at least one management bean provides support for introspection permitting external analysis of a composition of said at least one management bean, and wherein said at least one management bean is configured to be manipulated visually through a graphical user interface of a builder tool and through introspection of said at least one management bean; and
   b) compiling said model to implement said computer network management system in said bean-based environment, wherein said bean-based environment comprises a virtual machine.

2. The method of claim 1, wherein step (a) comprises defining at least one said management bean providing at least one property for modelling a property of a managed resource.

3. The method of claim 2, wherein step (a) comprises defining at least one said management bean including a method for modelling an action for said managed resource.

4. The method of claim 2, wherein step (a) comprises defining at least one said management bean providing support for at least one event for modelling an event of said resource.

5. The method of claim 1, wherein step (a) comprises defining the relationship and interactions between management beans as representative of the relationships and interactions between the managed resources.

6. The method according to claim 5, comprises defining at least one listener event in respect of at least one management bean.

7. The method of claim 1, wherein step (b) comprises:
   i) registering at least one said management bean with an extensible agent framework;
   ii) registering at least one network adaptor for a network communications protocol with said extensible agent framework; and
   ii) enabling external access via said network to said at least one management bean via said at least one network adaptor.

8. The method of claim 7, wherein said extensible agent framework comprises an associated repository bean and step (b)(ii) comprises registering said at least one management bean and/or said at least one network adaptor with said repository bean.

9. The method of claim 8, wherein said at least one network adaptor comprises a network adaptor bean.

10. A computer network management system comprising:
    an object-based network management modelling environment, including at least one management bean, wherein said at least one management bean corresponds to a resource that is controlled and monitored by an agent, wherein said at least one management bean provides support for introspection permitting external analysis of a composition of said at least one management bean;
    a builder tool for visually manipulating said at least one management bean through a graphical user interface, wherein in visually manipulating said at least one management bean, said builder tool is configured to perform external analysis of the composition of said at least one management bean through introspection of said at least one management bean;
    a compiler for said object-based environment for generating said computer network management system implementation in said object-based environment.

11. The computer network management system of claim 10, wherein at least one said management bean provides at least one property for modelling a property of a managed resource.

12. The computer network management system of claim 10, wherein at least one said management bean includes a method for modelling an action for said managed resource.

13. The computer network management system of claim 10, wherein at least one said management bean is provided with support for at least one event for modelling an event of said resource.

14. The computer network management system of claim 10, wherein a plurality of management beans defining the relationship and interactions between said management beans are representative of the relationships and interactions between the managed resources.

15. The computer network management system of claim 14, wherein at least one management bean is provided with support for a listener event.

16. The computer network management system of claim 10, wherein said compiled system comprises a network agent comprising:
    an extensible framework service object;
    at least one management bean registerable with said framework service;

at least one network adaptor bean registerable with said framework service for a network communications protocol for enabling access to said management beans.

17. The computer network management system of claim 16, wherein said network agent comprises an associated repository bean, said at least one management bean and/or said at least one network adaptor bean being registerable with said repository bean.

18. A computer-implemented method of generating a computer network management system, the method comprising:

defining a network management model including at least one management bean using a bean-based environment, wherein said at least one management bean corresponds to a resource that is controlled and monitored by an agent, wherein said at least one management bean provides support for introspection permitting external analysis of a composition of said at least one management bean, wherein said composition of said at least one management bean comprises one or more properties, one or more methods, and one or more events, and wherein said at least one management bean is configured to be manipulated visually through a graphical user interface of a builder tool and through introspection of said at least one management bean;

compiling said model to implement said computer network management system in said bean-based environment, wherein said bean-based environment comprises a virtual machine;

registering said at least one management bean with an extensible agent framework, wherein said extensible agent framework comprises at least one repository bean;

registering at least one network adaptor for a network communications protocol with said extensible agent framework; and enabling external access via a network to said at least one management bean via said at least one network adaptor.

* * * * *